United States Patent

[15] 3,640,600

Isobe

[45] Feb. 8, 1972

[54] ROCKING-TYPE APPARATUS PROVIDED WITH PRISM OR MIRRORS IN MICROSCOPE FOR BONDER

[72] Inventor: Masahide Isobe, Hayamacho, Japan

[73] Assignee: Tokyo Sokuhan Co., Ltd., Zama-machi, Koza-gun, Kanagawa-ken, Japan

[22] Filed: Oct. 15, 1969

[21] Appl. No.: 866,526

[30] Foreign Application Priority Data

Oct. 29, 1968 Japan..................................43/78818

[52] U.S. Cl...................................350/34, 350/25, 350/81, 350/287
[51] Int. Cl..........................................................G02b 7/18
[58] Field of Search.......................................350/33–35, 28, 350/25, 81, 287

[56] References Cited

UNITED STATES PATENTS 3,509,804    5/1970    Kohler et al........................350/34 UX Primary Examiner—David Schonberg
Assistant Examiner—Toby H. Kusmer
Attorney—McGlew & Toren

[57] ABSTRACT

A rocking-type microscope apparatus for a dice bonder comprises a prism or a pair of mirrors pivoted about a rocking axis at the lower part of the front end of the microscope on the face toward the objective. The rocking axis is mounted on one side of a cylindrical casing accommodating the objective of the microscope, or is mounted on one end of a bracket secured to a guide member of a sliding head or other element at an optional position. The prism or pair of mirrors can be rocked into and out of operative relation with the objective by means of a push rod, secured to the sliding head, in connection with a lever pivotal on the rocking axis and fixed relative to the prism or mirrors.

6 Claims, 7 Drawing Figures

3,640,600

ROCKING-TYPE APPARATUS PROVIDED WITH PRISM OR MIRRORS IN MICROSCOPE FOR BONDER

The present invention relates to rocking-type apparatus provided with a prism or mirrors cooperable with a microscope, for a dice bonder, to be aimed for observing both the operative position for picking up the dice, mounted on the dice cup, and the operative position for bonding, which latter position is disposed at a point spaced from the dice cup using only one microscope with shifting of neither of the two operative positions nor the position of the microscope. The apparatus utilizes either a prism or a pair of mirrors, either the prism or a pair of mirrors being mounted for swinging or pivoting about a rocking axis at the lower part of the front end of the microscope for cooperation with the objective. The rocking axis may be provided either on one side of the cylindrical casing of the microscope associated with a dice bonder, a beam lead bonder, or other similar instruments for making semiconductor products. Alternatively, the axis may be at one end of a stationary bracket secured to a guide member of a sliding head, at an optional position thereon, or on other elements.

There are known apparatuses of similar type having mirrors secured to the microscope at the front end thereof on the side toward the objective and to the sliding head at the front end thereof, respectively, for the same purpose as the one mentioned above. However, those known apparatuses, while effective for observing the operative position, utilizing the reflection of the mirror, when the mirrors are disposed at the operative position for picking up the dice mounted on the dice have such drawbacks which make it almost impossible to maintain constant equivalence in length of the refracting passage of reflected light, radiating at the operative position for picking up the dice, to that of the linear passage of the light which does not pass through the mirror at the operative position for bonding. The foregoing disadvantage is due to influences resulting from vertical adjustment of the sliding head, adjustment of the microscope elements along the optical axis to focus the microscope and also to difficulty in focusing at both operative position at the same time. In addition, the disadvantage is due to the inability to observe the dice, mounted on the dice cup, by means of the microscope, when the sliding head is not disposed at the operative position for picking up the dice with the microscope.

The present invention provides either a prism or a pair of mirrors rockably installed on a rocking axis at the lower part of the front end of the microscope toward the objective, the rocking axis being either at one side of the cylindrical casing accommodating the objective of the microscope or at an end of a bracket secured to the guide member of the sliding head or other element at an optional position thereof, and is designed to eliminate the aforementioned drawbacks in hitherto known apparatus. The invention is characterized by the feature of having constant equivalence in length of the refracting path of reflected light, passing through a prism or a pair of mirrors, at the operative position for picking up the dice to that of the linear path of the light, which does not pass through the prism or a pair of mirrors, at the operative position for bonding. Such equivalence of the lengths of the light paths is not influenced in any manner by vertical adjustment of the sliding head or by adjustment of the microscope along its optical axis. Thereby, it is possible easily to bring both operative positions into focus simultaneously.

Moreover, the prism, or a pair of mirrors, are arranged to be manually rocked, in a predetermined position of the apparatus, and when the sliding head is not at the operative position for picking up the dice by the microscope. In this case the tool for picking up the dice will not obstruct the field of vision, so that the condition of the dice, mounted on the dice cup, can be inspected.

For an understanding of the principles of the invention, reference is made to the following description of typical embodiments thereof as illustrated in the accompanying drawings.

DESCRIPTION OF THE PREFERRED EMBODIMENTS

As used in the specification and claims, the word "dice" is used to indicate a very small element such as a "pellet" or a "-tip."

Figure 1:
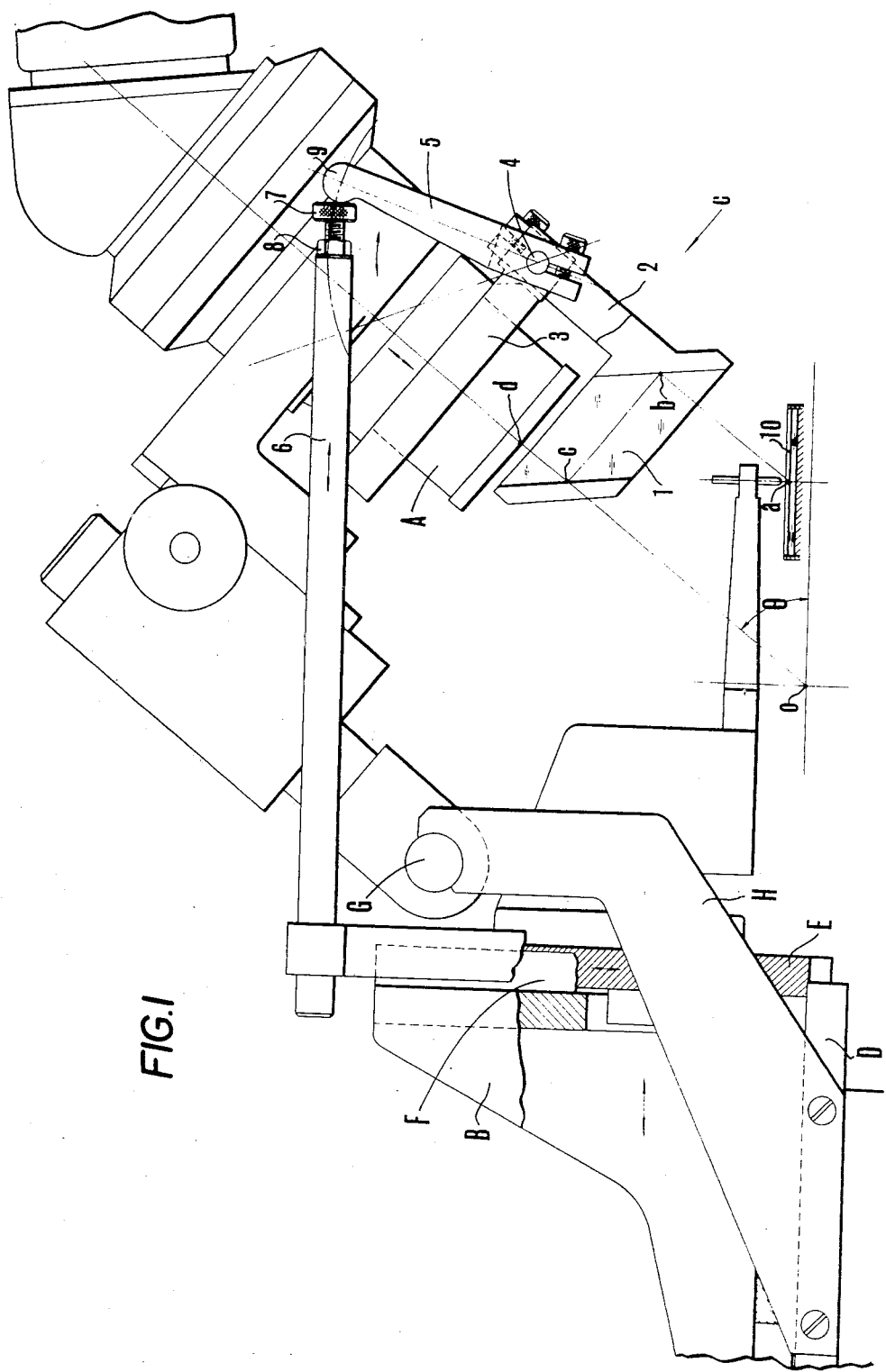
FIGS. 1 and 2 are side elevation views, partly in section, diagrammatically illustrating one embodiment of the invention utilizing a prism, with FIG. 1 showing the prism in the operative position for observing the dice mounted on a dice cup and FIG. 2 showing the apparatus in the operative position for bonding.
Figure 2:
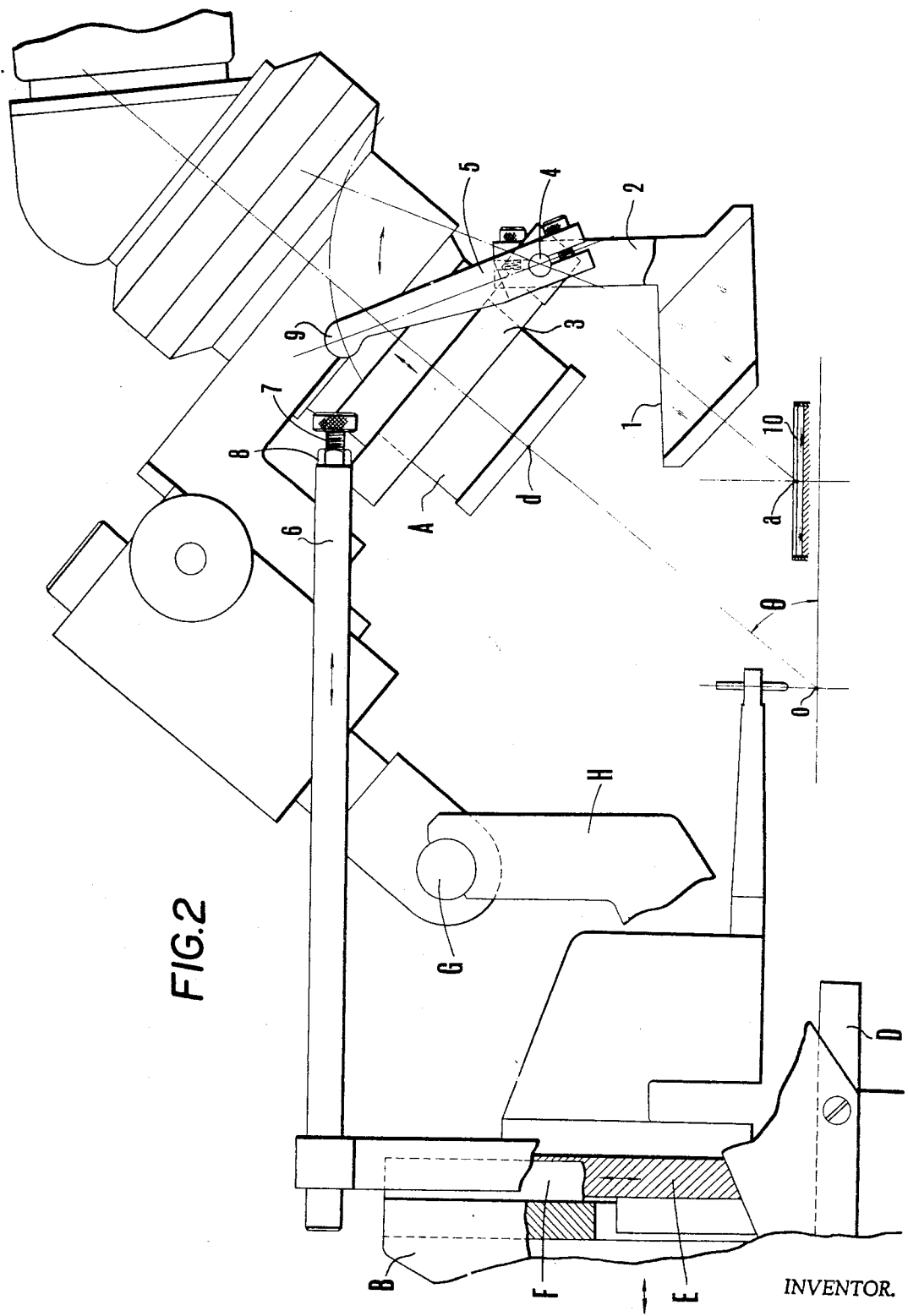
Figure 3:
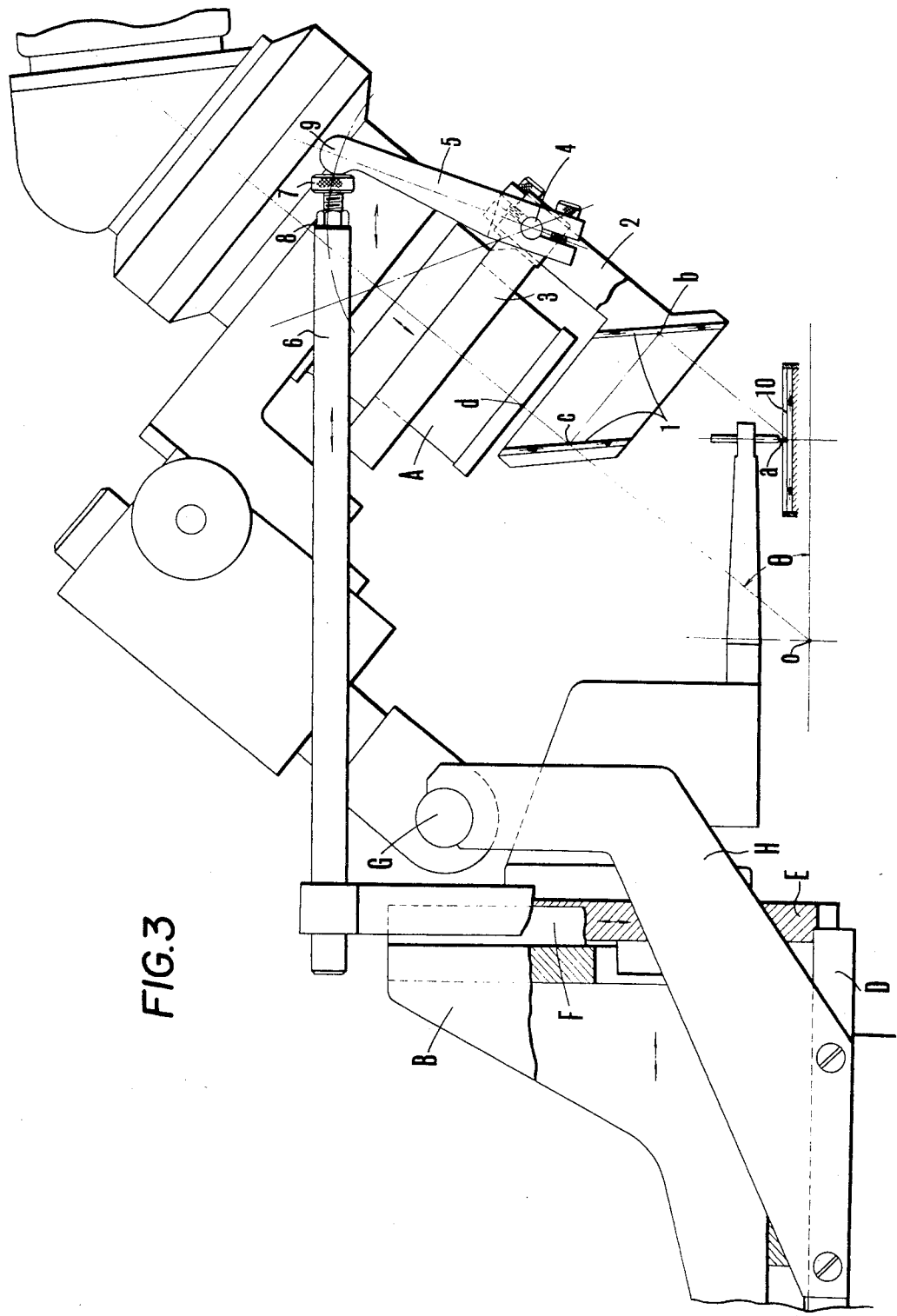
FIGS. 3 and 4 are views similar to FIGS. 1 and 2, respectively, but illustrating an embodiment of the invention in which the prism of FIGS. 1 and 2 is replaced by a pair of mirrors.
Figure 4:
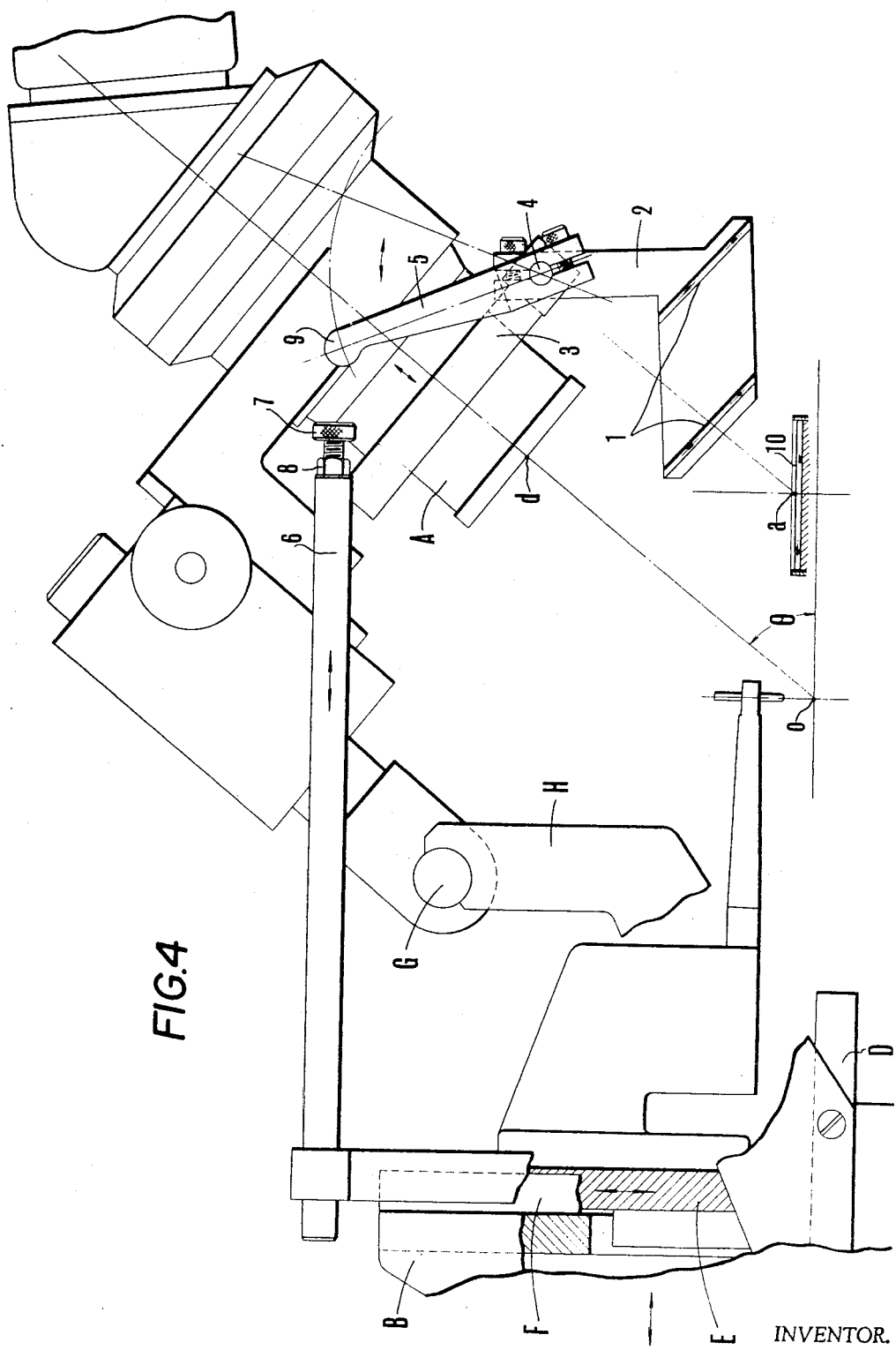
Figure 5:
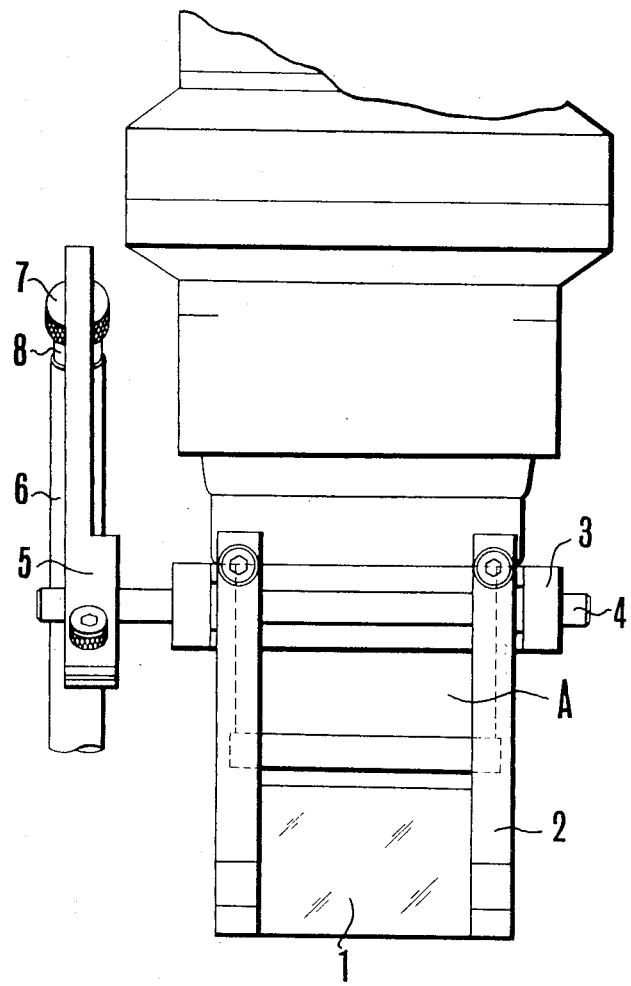
FIG. 5 is a perspective view of one part of the apparatus shown in FIG. 1 looking from the direction indicated by arrow C.

In the first place, the present invention will be explained referring to the apparatus illustrated in FIGS. 1 to 5. The reference manual 1 designates either a prism or a pair of mirrors alternatively supported by a holder 2. The numeral 3 represents a bracket secured to one side of the casing accommodating the objective of a microscope A therewithin. One end of bracket 3 rotatably supports a rocking axis or pivot 4 to which mirror holder 2 and a lever 5 are fixedly secured. The numeral 6 is a push rod securely mounted on a guide member F of a longitudinally adjustable slide member B forward and backward movement or of a slide member E available members B and E being parts of the sliding head. As viewed in FIG. 1 an adjusting screw 7 and a locking nut 8 are provided at the right end of the push rod 6. Whereby the right-hand surface of adjusting screw 7 is adapted to engage a top end 9 of the lever 5 so that the prism or a pair of mirrors 1 is subjected to be rotated clockwise about axis 4, to the position shown in FIGS. 1 and 3, responsive to maximum advance of slide member B of the sliding head. It will be noted that this is effected through the holder 2 secured to axis or pivot 4. As slide member B is advanced to the right, screw 7, engaging the top end 9 of lever 5, rotates this lever clockwise. When slide member B is retracted to the left, lever 5 will rotate counterclockwise through the moment effected by the deadweight of the prism or of the two mirrors, so that the parts occupy the positions shown in FIGS. 2 and 4. Of course, a spring may be provided to bias holder 2 and lever 5 in the counterclockwise direction responsive to retraction of movable slide member B. In the operative position for picking up the dice, as shown in FIGS. 1 and 3, the light is radiated, from the point marked by a symbol $a$ above a dice cup 10, into the microscope A along a path $a\ b\ c\ d$, of refracted light passing through the prism or light reflected by a pair of mirrors 1. In the operative position for bonding as shown in FIGS. 2 and 4, the light is radiated from a bonding point, marked by a symbol $o$, directly into the microscope A, passing from the point $o$ to the point $d$ without refraction at the prism or reflection at the pair of mirrors 1.

Figure 6:
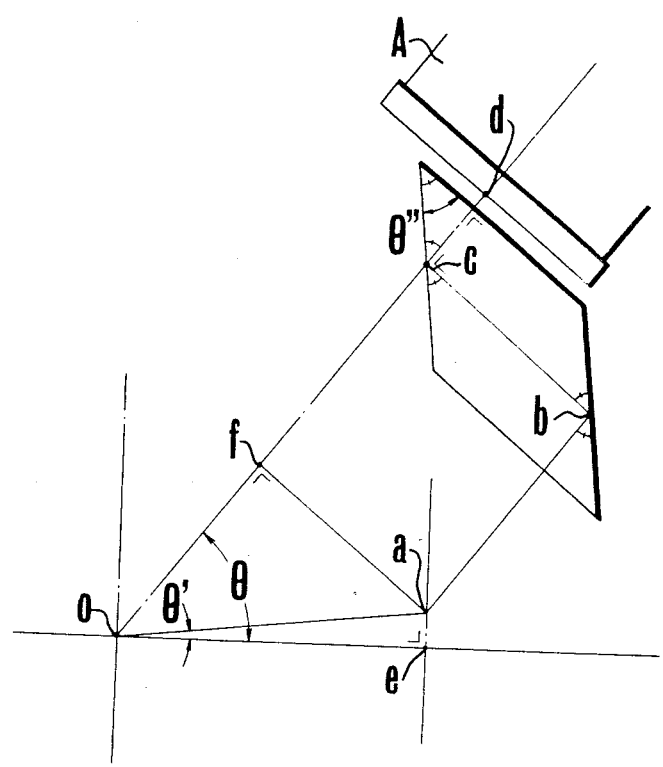
FIG. 6 is a diagrammatic illustration of the path of the light beam in the apparatus of the invention.

In case an angle $\theta$ formed by the optical axis $od$ of the microscope A and the horizontal plane intersecting optical axis $od$ is set to the precalculated value as shown in FIG. 6, which will be described hereinafter, so as to make the length of the refracting or reflecting path $a\ b\ c\ d$ of the beam equivalent to the length of the linear passage $od$ as well as to make the path $ab$ parallel to the path $od$, the length of the path $a\ b\ c\ d$ will constantly be equivalent to the length of the linear path $od$ when the microscope A is shifted along its optical axis in order to bring it into focus. Such adjustment is entirely independent of the position of the vertically movable slide member E of the sliding head, and results in a remarkably simple and easy action for bringing the microscope A into focus in the operations both of picking up the dice and of bonding hereinbefore described. The aforementioned equivalence of the length of the refracting path $a\ b\ c\ d$ to the linear passage $od$, which is independent of the position of movable slide member E of the sliding head becomes a matter of considerable importance. With this arrangement, there are avoided the difficulties, mentioned with respect to known devices of this type, relative to the inability to bring the microscope into correct focus, due to the variable length of the refracting path of the light at the operative position for picking up the dice, and in turn due to the relative vertical position of the sliding head. In the present invention, at any position of the vertically movable slide member E of the sliding head, the correct focus adjustment, once set, is maintained constant so that there can for clearly observing the operative position for picking up the dice. The angle $\theta$ formed by the optical axis $od$ of the microscope A and the horizontal plane can be determined according to the following procedure illustrated with reference to the diagram shown in FIG. 6.

The following calculation can be applied in the case where a pair of mirrors is used as the surface mirror, and in the case where a back mirror or a prism is used, the following calculation may be used with modification according to the refraction factor of the glass.

The path $od$ is parallel to the path $ab$ while the path $c$ is perpendicular to both paths $od$ and $ab$. Point $f$ designates the intersection, with path $od$, of a perpendicular to this path drawn from the point $a$, and point $e$ represents the intersection of a perpendicular to the horizontal plane drawn from the point $a$. For equivalence of the length of the refracting or reflecting path $a\ b\ c\ d$ to that of the linear path $od$, for the condition that the correct focus adjustment is maintained constant both in the case of observing point $a$ by a microscope A through the prism or pair of mirrors 1 and of observing point 0 by means of the microscope directly, that the following equation hold true:

$$ab+bc+cd=of+fc+cd$$

accordingly $$ab+bc=of+fc \quad (1)$$

As $abcf$ represents a parallelogram $$\left.\begin{array}{l}ab=fc\\bc=af\end{array}\right\} \text{ which are placed in the foregoing}$$

equation (1), whereby equation (1) becomes $$fc+af=of+fc$$

resulting in $$af=of \quad (2)$$

so that $\triangle\ oaf$ is a right-angled isosceles triangle and $\angle\ aof=45°$. aof+

In case $\angle\ aoe=\theta'$ be formed $$\tan\theta'=ae/oe \quad (3)$$
$$\theta=\angle\ aof+\theta'$$
$$=45°+\theta' \quad (4)$$

The value of $\theta'$ will be obtained from the equation (3) and the value of $\theta$ from the equation (4). However, $\theta$ need not necessarily be determined from the equation (4), whereby the length of the refracting or reflecting path $a\ b\ c\ d$ can be made equivalent to that of the linear path $od$ by means of forming a certain angle of the path $bc$ to the path $od$ to be different from a right angle, but it is desirable to have the value obtained from the equation (4) in order to make the prism or pair of mirrors in the most simple and compact shape for easy manufacturing thereof. When there is a parallelogram having an angle of $\theta''=45°$ in the side view, the upper and the lower surfaces thereof are parallel to the path of the light reflected between two reflecting surfaces constituting the right and the left sides, respectively, and thereby the overall arrangement becomes very compact.

Figure 7:
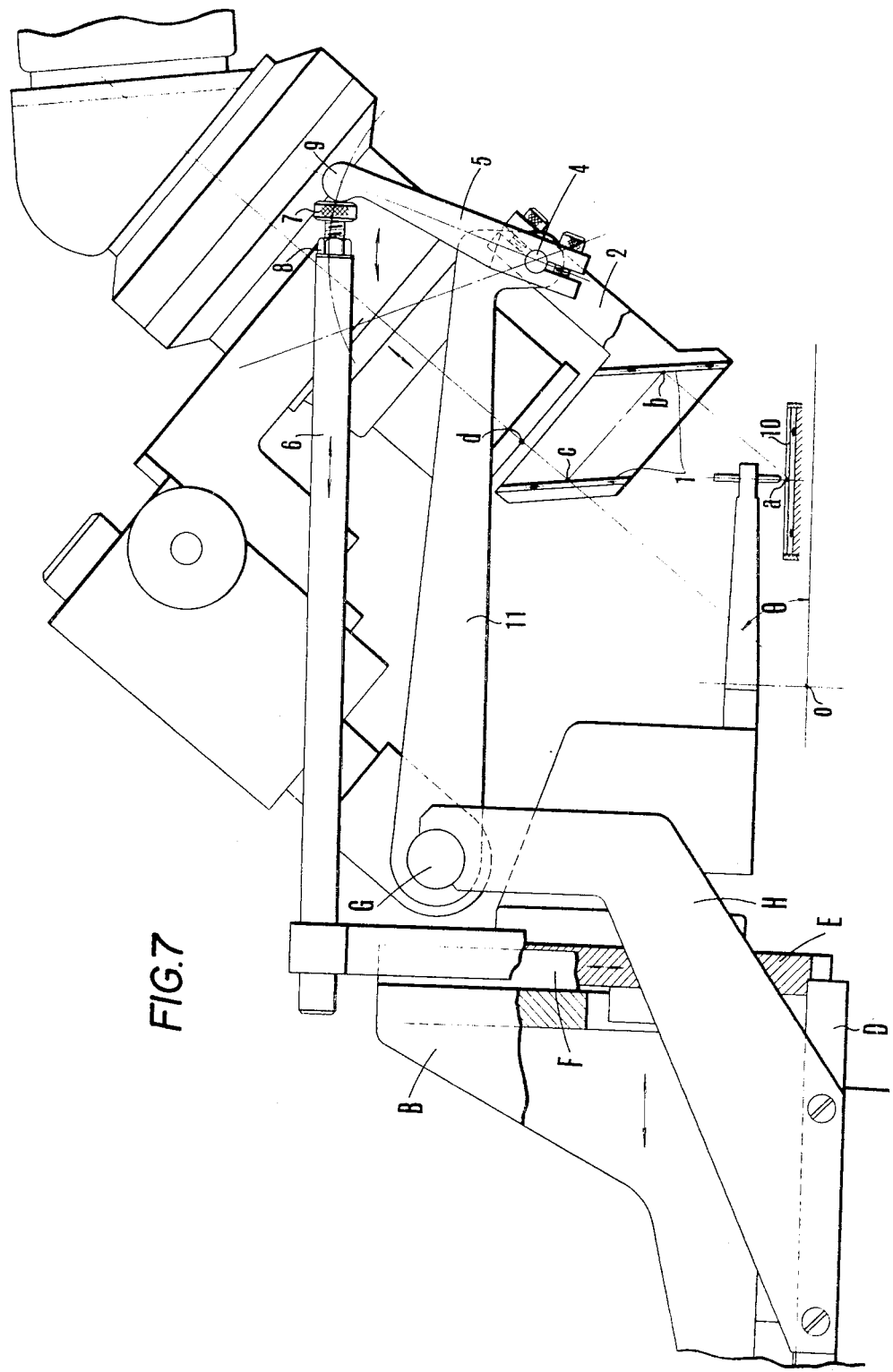
FIG. 7 is a view similar to FIGS. 1 and 3 but illustrating a modified mounting of the prism or the pair of mirrors.

In the second embodiment shown in FIG. 7, the rocking axis 4 is supported at the front end of a bracket 11 secured to an axis or pivot G for fixing the holder of the microscope A provided at the top end of a support H rigidly mounted on the guide member D of the longitudinally movable slide member B of the sliding head. In the first embodiment shown in FIGS. 1 to 5, the bracket 3 for supporting the rocking axis 4 is secured to one side of the casing accommodating the objective of the microscope A, whereby the prism or pair of mirrors 1 has a pivotal support axis which is fixed relatively to the optical axis of microscope A. In the embodiment shown in FIG. 7, the bracket 11 supporting the rocking axis 4 is not secured to the microscope A, so that differing from the first embodiment, the pivotal support axis of the prism or pair of mirrors 1 is not fixed relative to the optical axis. However, the following features of the second embodiment are quite similar to those of the first embodiment shown in FIGS. 1 to 5, such as the vertically movable slide member E of the sliding head, the constant equivalence of the length of the refracting or reflecting path for the light passing through the prism or reflected by a pair of mirrors 1 in the operative position for picking up the dice to the length of the linear path of the light which does not pass through the prism or between a pair of mirrors 1 in the operative position for bonding, which equivalence exists independent of any position adjustment relative to the optical axis of the microscope A, and the rocking movement of the rockable prism or pair of mirrors 1.

The present invention provides a simple construction in which two operative positions, one for picking up the dice placed on the dice cup and the other for bonding and spaced apart a certain distance from the former, are able to be observed in constant and accurate focus by one microscope utilizing the rocking movement of the prism or a pair of mirrors, neither shifting the two operative positions nor the microscope, whereby observations of the two operative positions are brought into constantly accurate focus to be carried out irrespective of the location of the sliding head whether it be positioned upward or downward, forward or rearward and, in consequence, has a very advantageous effect for manufacturing IC circuits and the like.

What is claimed is:

1. In observation apparatus for particle bonders, of the type including a microscope having an objective range in a casing, said objective defining an optical axis, and vertically and horizontally adjustable slide means, the improvement comprising, in combination, optical means operable to redirect entering light along an exit path of said optical means in spaced parallel relation to the entry path of said optical means, said entry path being coextensive with said optical axis of said objective; a holder supporting said optical means; a pivot shaft fixed to said holder in spaced relation to said optical means and forming a swinging axis for said optical means; mounting means supporting said pivot axis adjacent to said casing and extending transversely of said optical axis of said objective, for swinging of said optical means between a first position, in which said exit path is aligned with said optical axis, and a second position, in which said optical means is swung away from said object; said optical means being biased to said second position; a lever secured to and projecting from said pivot shaft; and means operable by said slide means to swing said lever to swing said optical means into said first position.

2. In observation apparatus for particle bonders, the improvement claimed in claim 1, in which said means operable by said slide means comprises a push rod mounted on said slide means and engageable with the free end of said lever.

3. In observation apparatus for particle bonders, the improvement claimed in claim 2, in which said optical means comprises a prism.

4. In observation apparatus for particle bonders, the improvement claimed in claim 2, in which said optical means comprises a pair of mirrors.

5. In observation apparatus for particle bonders, the improvement claimed in claim 2, in which said mounting means comprises a clamp secured to said casing.

6. In observation apparatus for particle bonders, the improvement claimed in claim 2, in which said mounting means comprises a support arm supported at one end on said apparatus and having a free end mounting said pivot shaft.